United States Patent
Wissler et al.

(10) Patent No.: US 6,408,619 B1
(45) Date of Patent: Jun. 25, 2002

(54) METHOD AND DEVICE FOR REDUCING THE NITROGEN OXIDES IN THE EXHAUST GAS OF A COMBUSTION SYSTEM

(75) Inventors: Gerhard Wissler, Sünching; Günther Pajonk, Zapfendorf; Manfred Weigl, Viehhausen; Lothar Hofmann, Altenkunstadt, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/596,893

(22) Filed: Jun. 19, 2000

Related U.S. Application Data

(63) Continuation of application No. PCT/DE98/03643, filed on Dec. 11, 1998.

(30) Foreign Application Priority Data

Dec. 17, 1997 (DE) .......................................... 197 56 251

(51) Int. Cl.$^7$ ................................................. F01N 3/00
(52) U.S. Cl. .............................. 60/286; 60/295; 60/303
(58) Field of Search .......................... 60/274, 277, 286, 60/301, 303, 295, 285

(56) References Cited

U.S. PATENT DOCUMENTS

| | | | |
|---|---|---|---|
| 4,963,332 A | * 10/1990 | Brand et al. | 423/235 |
| 5,406,790 A | * 4/1995 | Hirota et al. | 60/276 |
| 5,628,186 A | * 5/1997 | Schmelz | 60/274 |
| 5,643,536 A | * 7/1997 | Schmelz | 422/105 |
| 5,732,554 A | * 3/1998 | Sasaki et al. | 60/278 |
| 5,884,476 A | * 3/1999 | Hirota et al. | 60/278 |
| 6,119,448 A | * 9/2000 | Emmerling et al. | 60/274 |

FOREIGN PATENT DOCUMENTS

| | | |
|---|---|---|
| DE | 42 17 552 C1 | 8/1993 |
| DE | 42 37 705 A1 | 5/1994 |
| DE | 43 34 071 C1 | 2/1995 |
| DE | 44 35 103 A1 | 4/1996 |
| DE | 195 36 571 A1 | 4/1997 |
| EP | 0 555 525 A1 | 8/1993 |
| EP | 0 652 500 A2 | 5/1995 |
| EP | 0 881 367 A1 | 12/1998 |

OTHER PUBLICATIONS

"SINOx Sickoxidminderung für stationäre Dieselmotoren", Power for Generations, Siemens Energieerzeugung, pages 2–7, pertains to the reduction of nitrogen oxide in stationary Diesel engines, as mentioned on p. 2 of the specification.

* cited by examiner

Primary Examiner—Thomas Denion
Assistant Examiner—Binh Tran
(74) Attorney, Agent, or Firm—Herbert L. Lerner; Laurence A. Greenberg; Werner H. Stemer

(57) ABSTRACT

When determining the amount of a reducing agent solution to be introduced into the exhaust gas of a combustion system, in particular of a diesel engine, for catalytically reducing the nitrogen oxides by the SCR process, the concentration of the reducing agent in the reducing agent solution as well as the parameters characterizing the operating state of the combustion system, the exhaust gas and/or the catalyst are taken into consideration. As a result, the safety margin with respect to a theoretically optimum amount to be introduced that is required to avoid a leakage of reducing agent can be reduced, whereby the conversion rate of the nitrogen oxides is improved.

9 Claims, 1 Drawing Sheet

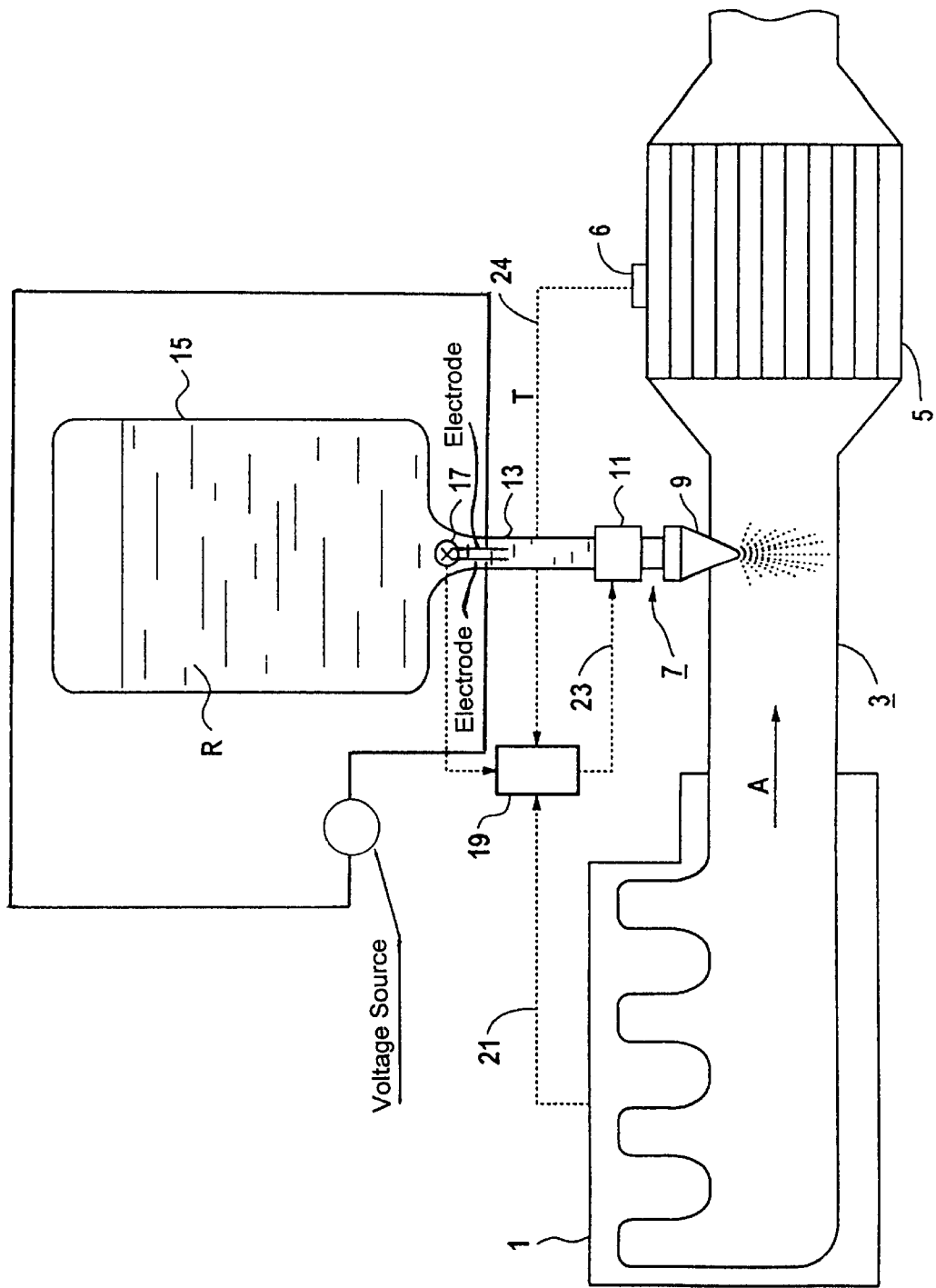

METHOD AND DEVICE FOR REDUCING THE NITROGEN OXIDES IN THE EXHAUST GAS OF A COMBUSTION SYSTEM

CROSS-REFERENCE TO RELATED APPLICATION

This is a continuation of copending international application PCT/DE98/03643, filed Dec. 11, 1998, which designated the United States.

BACKGROUND OF THE INVENTION

Field of the Invention

The invention relates to a method and a device for the catalytic conversion of nitrogen oxides in the exhaust gas of a combustion system, in particular of a diesel engine.

The combustion of fossil fuel such as petroleum or coal in a combustion system, in particular of diesel fuel in a diesel engine, may involve the production of not inconsiderable amounts of pollutants which may be discharged via the exhaust into the environment and cause damage there. Of these pollutants, the nitrogen oxides in particular present a not inconsiderable problem, since they are believed to be one of the factors contributing to acid rain and the dying of forests.

To reduce the amount of nitrogen oxides emitted into the environment it is known to use catalysts arranged in the exhaust line of a combustion system for the catalytic conversion of the nitrogen oxides contained in the exhaust gas into harmless substances.

For an internal combustion engine operated with excess air, such as a diesel engine, it is known to remove the nitrogen oxides from the exhaust gas by the process of selective catalytic reduction (SCR process). In this case, a reducing agent is introduced into the exhaust gas before it flows through a so-called SCR or DeNOx catalyst, said reducing agent converting the nitrogen oxides contained in the exhaust gas in the presence of oxygen at the catalyst into harmless nitrogen and water. Ammonia is generally used here as the reducing agent. It is also known to supply the reducing agent by introducing into the exhaust gas a reducing agent solution, from which the actual reducing agent is released. In the case of ammonia, such a reducing agent solution is, for example, an aqueous urea solution or ammonia water. See in this respect the Siemens company publication: SINOx, Stickoxidminderung für stationäre Dieselmotoren [Nitrogen Oxide Reduction For Stationary Diesel Engines], 1997, order No.: A96001-U91-A232.

In the reduction of nitrogen oxides by the SCR process, an amount of reducing agent that is adapted to the current nitrogen oxide emission must constantly be introduced into the exhaust gas in order to achieve a high conversion rate of the nitrogen oxides at the catalyst, without being accompanied by an appreciable leakage of reducing agent, which in the case of ammonia would be harmful for the environment.

In particular, in the case of non-stationary combustion systems, such as diesel engines for the traction of trucks or passenger cars, which are operated with frequent load changes, it proves to be extremely difficult to determine the amount of reducing agent to be introduced. Since high-speed sensors for directly determining the nitrogen oxide concentration in the exhaust gas are not so far known, the nitrogen oxide concentration must be determined from the parameters characterizing the operating state of the combustion system, such as rotational speed, torque or control rod displacement. For this purpose, the concentration of the nitrogen oxides is respectively determined for defined operating states of the combustion system on a test bench and are stored in a characteristic map in a monitoring unit. This characteristic map is then used during operation to read from the parameters characterizing the operating state of the combustion system the concentration of the nitrogen oxides and to meter in a corresponding amount of reducing agent or reducing agent solution. However, especially when there are highly fluctuating exhaust gas temperatures or when the combustion system or the catalyst is ageing, it is always necessary to maintain a certain safety margin with respect to the amount of reducing agent actually required in order to be certain of avoiding any leakage of the reducing agent. Therefore, slightly less reducing agent than would be necessary for conversion of the nitrogen oxides is always fed in. To avoid leakage, the system operates below the conversion rate that is theoretically possible.

For more accurate metering and to reduce the safety margin, it is also known from German patent application DE 195 36 571 A1 to take into consideration parameters of the exhaust gas such as the temperature, pressure or chemical composition, as well as parameters characterizing the catalyst, such as the storage capacity, for example for reducing agent, temperature, catalytic activity or structure, in the determination of the amount of reducing agent to be metered in. Considering in particular the storage capacity of the catalyst allows a further reduction of the safety margin, and consequently an increase in the conversion rate, since then the reducing agent stored by the catalyst at low temperatures by adsorption and given off to the exhaust gas at high temperatures by desorption is also taken into account.

SUMMARY OF THE INVENTION

It is accordingly an object of the invention to provide a method and a device for the catalytic reduction of nitrogen oxides contained in the exhaust gas of a combustion system, that overcome the above-mentioned disadvantages of the prior art devices and methods of this general type, in which it is certain that reducing agent leakage is avoided and at the same time the conversion rate of the nitrogen oxides is increased in comparison with the prior art.

With the foregoing and other objects in view there is provided, in accordance with the invention, a method for catalytically reducing nitrogen oxides in the exhaust gas of a combustion system, in particular of a diesel engine, in which method an amount of a reducing agent solution to be metered is determined in dependence on parameters characterizing the operating state of the combustion system, the exhaust gas and/or a catalyst and is introduced into the exhaust gas upstream of the catalyst in the direction of flow of the exhaust gas, the reducing agent is released from the reducing agent solution and converted with the nitrogen oxides at the catalyst, and according to the invention the concentration of the reducing agent solution is determined discontinuously during and/or before the reducing agent solution is introduced into the exhaust gas and the amount to be metered is adapted to the concentration determined. The method of reducing nitrogen oxides in the exhaust gas of a combustion system accordingly comprises the steps of providing a source of reducing agent and an exhaust gas line, introducing into the exhaust gas line upstream of the catalyst in the direction of flow of the exhaust gas an amount of reducing agent metered in dependence on the concentration of reducing agent in said source and at least one parameter characterizing the operating state of the combustion system, the exhaust gas and/or the catalyst, and flowing the exhaust gas and the reducing agent over the catalyst, wherein the concentration of the reducing agent in the source is determined discontinuously during and/or before the reducing agent is introduced into the exhaust gas and the amount to be metered is adapted to the concentration determined.

The invention is based on the observation that, even with an amount of reducing agent to be metered in that has been calculated with the storage capacity of the catalyst and the composition of the exhaust gas taken into consideration, under certain operating conditions a leakage of reducing agent can occur. The leakage of reducing agent occurs to an increased extent when the actual reducing agent is released from a reducing agent solution, which may be a consequence of different concentrations of the reducing agent solutions used. Since, in conventional metering methods, a fixed concentration is taken as a basis, different concentrations resulting from production reasons or due to effects of evaporation lead to not inconsiderable deviations of the amount of reducing agent actually introduced in comparison with the amount intended. These metering errors when introducing the reducing agent solution can be avoided, however, by using the concentration of the reducing agent solution in the determination of the amount of reducing agent actually injected into the exhaust gas. If the actual concentration of the reducing agent solution is known, consequently the amount of reducing agent, or the amount of substance releasing the reducing agent per unit volume of the reducing agent solution, is known. Consequently, the amount for feeding calculated from a prescribed, i.e. assumed, concentration of the reducing agent solution can be adapted to the actual concentration. The adaptation to the actual concentration can take place, for example, by means of a correction factor, so that in volumetric metering, with an actual concentration reduced in comparison with the assumed concentration, the volume of the reducing agent solution metered in is increased or, with an actual concentration increased in comparison with the assumed concentration, the volume is reduced. However, it is just as conceivable to replace the value of the assumed concentration of the reducing agent solution, stored for example in a monitoring unit, by the actual value and then to use this value for calculating the amount of reducing agent solution to be metered.

In comparison with the prior art, the invention affords a further reduction of the safety margin between the amount of reducing agent actually introduced and the theoretically optimum amount, without leakage of the reducing agent occurring. As a result, a high conversion rate of the nitrogen oxides can be achieved, specifically also in the case of a non-stationary combustion system, in particular in the case of a diesel engine.

Since the reducing agent solution is generally kept in a closed container, a rapid change in the concentration of the reducing agent solution is not to be expected. It is therefore sufficient to determine the concentration of the reducing agent solution discontinuously, for example periodically at prescribed time intervals.

The discontinuous determination of the concentration of the reducing agent solution advantageously takes place each time a storage container is filled with reducing agent solution. This makes it possible for production-dependent changes in concentration during filling or else mixing with old reducing agent solution of a different concentration possibly still in the reducing agent tank to be taken into consideration in metering. This is advantageous in particular in the case of non-stationary combustion systems, such as a diesel engine used for traction, when, for example, it is necessary at regular intervals for reducing agent solution of different origins to be used for filling the storage container at different locations.

The metering accuracy can be increased still further if the momentary concentration of the reducing agent solution is determined during and/or before the introduction of the reducing agent solution into the exhaust gas. As a result, factors influencing the concentration, such as density fluctuations in the event of temperature changes, evaporation and contamination of the reducing agent solution, can also be taken into consideration and allowed for during metering of the reducing agent solution.

The concentration of the reducing agent solution is preferably determined by measuring the conductivity of the reducing agent solution. This is of course conditional on the reducing agent solution being electrically conductive, as is the case for example with an aqueous urea solution as the source of reducing agent. It is also possible, however, to determine the concentration of the reducing agent solution by measuring its pH. This is possible, for example, when using ammonia water as the source of reducing agent.

In an expedient refinement of the invention, an aqueous urea solution from which ammonia is released is introduced as the reducing agent solution. The released ammonia is converted with the nitrogen oxides at a DeNOx catalyst on the basis of $TiO_2$, with additional amounts of $V_2O_5$, $MoO_3$ and/or $WO_3$.

With the foregoing and other objects in view there is also provided, in accordance with the invention, a device for catalytically reducing nitrogen oxides in the exhaust gas of a combustion system, in particular of a diesel engine, comprising an exhaust line, a catalyst, a metering device, disposed upstream of the catalyst in the direction of flow of the exhaust gas for introducing a defined amount of a reducing agent from a source thereof into the exhaust gas, and a monitoring unit, connected to the metering device for entering and determining the amount of reducing agent to be metered from at least one parameter characterizing the operating state of the combustion system, the exhaust gas and/or the catalyst, in which device, according to the invention, a sensor is provided for measuring the concentration of the reducing agent in its source, which sensor is in communication with the monitoring unit, such that the monitoring unit adapts the amount of reducing agent to be metered to the concentration of reducing agent available through the sensor.

From the available parameters characterizing the operating state of the combustion system, the exhaust gas and/or the catalyst, the monitoring unit initially determines by means of an implemented characteristic map the assigned nitrogen oxide fraction of the exhaust gas and calculates from this the amount of reducing agent necessary for the conversion of the nitrogen oxides contained in the exhaust gas to harmless substances. A suitable sensor further determines the concentration of the reducing agent in its solution or other source and communicates this to the monitoring unit. The monitoring unit then adapts the amount of reducing agent solution to be introduced into the exhaust gas, which includes the amount of reducing agent necessary for the momentary nitrogen oxide content of the exhaust gas, to the concentration measured by the sensor.

If the monitoring unit is operating with a fixed prescribed value for the concentration of the reducing agent solution (for example as specified by the manufacture), a corresponding correction factor is determined from the momentary concentration. It is also possible to substitute the value for the concentration of the reducing agent solution stored in the monitoring unit by the actual value and to use this directly for calculating the amount of reducing agent solution to be metered in. Finally, the monitoring unit instigates the introduction of the adapted amount of reducing agent solution into the exhaust gas by the metering device.

The sensor for determining the concentration of the reducing agent solution is advantageously a conductivity sensor. For this purpose, the conductivity sensor preferably comprises two electrodes, which can be connected to a voltage source and can be dipped into the reducing agent solution. If a known voltage is applied to the electrodes, there flows in the reducing agent solution a current from which it is possible to determine the electrical resistance of the reducing agent solution and consequently the concentration of the reducing agent in the reducing agent solution. The great reliability of the conductivity sensor permits consistently good detection of the concentration over the entire time during which the combustion system is in operation.

Where the source of reducing agent is an aqueous urea solution, the sensor preferably consists of a urea-resistant material, such as stainless steel.

Although the invention is illustrated and described herein as embodied in a method and device for the reduction of nitrogen oxides in the exhaust gas of a combustion system, it is nevertheless not intended to be limited to the details shown, since various modifications and structural changes can be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawing.

BRIEF DESCRIPTION OF THE DRAWINGS

As a non-limiting example of the invention, the drawing shows a schematic representation of a diesel engine, with a device connected to the exhaust line for catalytically reducing the nitrogen oxides contained in the exhaust gas by the SCR process, the concentration of the reducing agent solution to be introduced into the exhaust gas being taken into consideration.

DESCRIPTION OF THE PREFERRED EMBODIMENTS

Referring now to the figure of the drawing in detail there is shown, as an exemplary combustion system 1, a diesel engine with an exhaust line 3 and a catalyst 5. The catalyst 5 is in the form of a honeycomb DeNox catalyst for reducing nitrogen oxides by the SCR process and comprises as its main constituent $TiO_2$, as well as additional amounts of $WO_3$, $V_2O_5$ and $MoO_3$. The catalyst (5) is assigned a temperature sensor 6 for determining the temperature T of the catalyst 5. Disposed on the exhaust line 3 upstream of the catalyst 5 in the direction of flow of an exhaust gas A is a metering device 7 for a reducing agent solution R, which comprises an injection nozzle 9 and a valve 11. The metering device 7 is connected to a storage container 15 via a supply line 13. Used as the source of reducing agent is an aqueous urea solution R, which releases ammonia as the reducing agent when it is introduced into the hot exhaust gas A of the diesel engine.

At the lowest point of the storage container 15, in the region of the mouth of the supply line 13, there is a sensor 17 for determining the concentration of the reducing agent solution R. The sensor 17 is a conductivity sensor, which comprises two electrodes (not represented in detail), which are connected to a voltage source and can dip into the reducing agent solution. A voltage applied to the electrodes is used to derive the electrical resistance, and consequently the concentration of the aqueous urea solution, from the current then flowing.

The sensor 17 is in communication with a monitoring unit 19, which additionally detects via a data line 21 one or more of the torque, rotational speed, operating temperature and fuel consumption as parameters characterizing the operating state of the diesel engine. The monitoring unit 19 is also connected via a control line 23 to the valve 11 of the metering device 7. The temperature T of the catalyst 5 is also made available to the monitoring unit via a data line 24.

The monitoring unit 19 determines the nitrogen oxide emission of the diesel engine from the parameters characterizing the operating state of the diesel engine available to it via the data line 21. For this purpose, the nitrogen oxide emission belonging to the values of the corresponding parameters is read out from a characteristic map stored in the monitoring unit 19. The monitoring unit 19 also takes into consideration, via the temperature of the catalyst 5, the filling level of reducing agent in the catalyst and finally calculates the amount of reducing agent to be fed to the exhaust gas A, in particular calculates from a prescribed concentration of the reducing agent in the reducing agent solution (R) the amount of reducing agent solution (R) to be fed in.

Before injection, the monitoring unit 19 detects via the sensor 17 the current concentration of the reducing agent solution R in the storage container 15 and then determines by means of a correction factor an amount of reducing agent solution adapted correspondingly to the current concentration. Finally, the metering device 7 instigates via the control line 23 the injection of the adapted amount of reducing agent solution R via the valve 11 and the injection nozzle 9 into the exhaust gas A in a known way.

We claim:

1. A method for catalytically reducing nitrogen oxides in an exhaust gas of a combustion system by reaction of the nitrogen oxides with a reducing agent in a presence of a catalyst, which comprises the following steps:

providing an exhaust gas line and a source of reducing agent, introducing into the exhaust gas line upstream of the catalyst in a flow direction of the exhaust gas an amount of a reducing agent metered in dependence on a concentration of reducing agent in the source and at least one parameter characterizing an operating state of one of the combustion system, the exhaust gas, and the catalyst, conducting the exhaust gas and the reducing agent over the catalyst, and wherein said source is a solution of reducing agent in a storage container and the concentration of the reducing agent in said source is determined discontinuously each time said container is filled with the reducing agent solution and not later than when the reducing agent is introduced into the exhaust gas line and adapting the amount to be metered to the concentration determined in the determining step.

2. The method according to claim 1, wherein the reducing agent is an aqueous urea solution and the catalyst is a DeNOx catalyst.

3. The method according to claim 1, wherein the combustion system is a diesel engine.

4. A method for catalytically reducing nitrogen oxides in the exhaust gas of a combustion system by reaction of said nitrogen oxides with a reducing agent in the presence of a catalyst, comprising the steps of providing an exhaust gas line and a source of reducing agent, introducing into said exhaust gas line upstream of the catalyst in the direction of flow of the exhaust gas an amount of a reducing agent metered in dependence on the concentration of reducing agent in said source and at least one parameter characterizing the operating state of the combustion system, the exhaust gas and/or the catalyst, and flowing said exhaust gas and said reducing agent over said catalyst, wherein the concentration of the reducing agent in said source is determined not later than when the reducing agent is introduced into the exhaust gas line, and the amount to be metered is adapted to the concentration determined, and wherein the concentration of the reducing agent is determined by measuring the conductivity of a solution of the reducing agent.

5. A device for catalytically reducing nitrogen oxides in the exhaust gas of a combustion system, comprising an exhaust line, a source of reducing agent, a catalyst, a metering device disposed upstream of the catalyst in the direction of flow of the exhaust gas for introducing a defined amount of reducing agent into the exhaust gas, a monitoring unit connected to said metering device for determining the amount of reducing agent solution to be metered from at least one parameter characterizing the operating state of the combustion system, the exhaust gas, and/or the catalyst, and a sensor in communication with said monitoring unit for measuring the concentration of the reducing agent solution, wherein said source is a solution of reducing agent in a storage container and the concentration of the reducing agent in said source is determined discontinuously each time said container is filled with the reducing agent solution such that the monitoring unit adapts the amount of reducing agent solution to be metered to said concentration available trough the sensor.

6. The device according to claim 5, wherein the combustion system is a diesel engine.

7. The device according to claim 5, wherein the sensor is a conductivity sensor.

8. The device according to claim 7, wherein the conductivity sensor comprises two electrodes connected to a voltage source and immersible in the reducing agent solution.

9. The device according to claim 5, wherein the reducing agent is an aqueous urea solution and the catalyst is a DeNOx catalyst.

* * * * *